US012590876B2

(12) United States Patent

Vieira et al.

(10) Patent No.: US 12,590,876 B2
(45) Date of Patent: Mar. 31, 2026

(54) FORCE CONTROL IMPROVEMENT THROUGH COMBINED STROKE FEEDFORWARD AND STROKE FEEDBACK COMPENSATION

(71) Applicant: The Boeing Company, Arlington, VA (US)

(72) Inventors: Alessandro Vieira, Seattle, WA (US); Gerard V. Bohr, Orange, CA (US)

(73) Assignee: THE BOEING COMPANY, Arlington, VA (US)

( * ) Notice: Subject to any disclaimer, the term of this patent is extended or adjusted under 35 U.S.C. 154(b) by 459 days.

(21) Appl. No.: 18/323,535

(22) Filed: May 25, 2023

(65) Prior Publication Data

US 2024/0393216 A1    Nov. 28, 2024

(51) Int. Cl.
  G01N 3/36     (2006.01)
  B64F 5/60     (2017.01)
  G01N 3/32     (2006.01)

(52) U.S. Cl.
  CPC ................. G01N 3/36 (2013.01); B64F 5/60 (2017.01); *G01N 2203/0073* (2013.01); *G01N 2203/0202* (2013.01); *G01N 2203/0676* (2013.01); *G01N 2203/0682* (2013.01)

(58) Field of Classification Search
  CPC ............. G01N 3/36; G01N 2203/0073; G01N 2203/0202; G01N 2203/0676; G01N 2203/0682; G01N 3/10; G01N 3/08; G01N 3/32; B64F 5/60; G01M 5/0016;

G01M 7/022; G05B 19/19; G05B 13/024; G05B 11/28; G05B 17/02; G05B 11/42; G05B 11/01; G05B 13/042; G05B 19/351; B64C 13/507; B64C 13/40; B64C 13/503; G11B 5/5547; G05D 1/0858; G05D 16/2013; G05D 15/01; G05D 3/14; G05G 5/03; F01L 9/20; F15B 11/048; F15B 9/03; F15B 19/002; E02F 3/437; G06F 3/016; G01F 1/696; B60G 17/018
See application file for complete search history.

(56) References Cited

U.S. PATENT DOCUMENTS

| | | | | |
|---|---|---|---|---|
| 7,373,836 B2 | 5/2008 | Bohr et al. | | |
| 7,493,826 B2 | 2/2009 | Bohr et al. | | |
| 10,545,464 B2 * | 1/2020 | Anderson | ........... | G05B 13/024 |
| 11,460,388 B2 | 10/2022 | Johnson | | |
| 2021/0025797 A1 * | 1/2021 | Johnson | ................. | G01N 3/32 |

FOREIGN PATENT DOCUMENTS

WO      WO-2017100113 A1 *   6/2017   ............... G01L 1/26

* cited by examiner

*Primary Examiner* — Brandi N Hopkins
(74) *Attorney, Agent, or Firm* — COATS & BENNETT, PLLC

(57) ABSTRACT

Control compensation methods and configurations for controlling actuators that are applying forces to a test article. The control compensation methods and configurations reduce force control tracking errors by the use of combined stroke feedforward and stroke feedback signals. These counteract errors caused by multi-actuator cross coupling and other challenging behaviors caused by various issues with the actuators.

20 Claims, 4 Drawing Sheets

FORCE CONTROL IMPROVEMENT THROUGH COMBINED STROKE FEEDFORWARD AND STROKE FEEDBACK COMPENSATION

TECHNOLOGICAL FIELD

The present disclosure relates generally to the field of article testing and, more specifically, to control compensation methods.

BACKGROUND

Various techniques may be used for testing articles during development and manufacturing. Various fatigue tests for durability, lifespan, and performance requirements may be validated by static, quasi-static, and dynamic testing. Specifically, testing techniques that simulate a working environment may be utilized to determine whether the articles perform their intended function during their lifespan.

Actuators are typically utilized when performing long-term or large-scale testing. The actuators exert forces on the articles during the testing. The force exerted on the articles is expected to be accurately controlled. Furthermore, the actuators are expected to follow the motion of the article, without imposing uncharacteristic forces or restricting the motion of the article. For example, when testing an airfoil or wing of an aircraft, numerous actuators may be coupled to various surfaces of the wing. The actuators on the different surfaces work in unison to flex the airfoil. Thus, when the wing is flexed in an upward direction, the actuators coupled to the top side of the wing follow the motion and velocity of the wing, without uncharacteristically restricting the movement of the wing while the actuators coupled to a bottom side of the wing are also exerting force in the upward direction.

Dynamic force control involves the accurate application of compressive and tensile forces to a moving article. When the force is exerted on the moving article using hydraulic actuators and servo valves based on classical control methods, sometimes the force applied by a given actuator may become inaccurate during rated test conditions. Specifically, there may be inaccuracy in the force exerted upon the article relative to a command signal, which is attributed to the motion of the article.

Servo-valve controlled hydraulic actuators have undesirable non-linear control characteristics that negatively impact force control quality. Proportional-integral-differential (PID) force control loops are common compensation methods used to control the actuators. These control loops are unable to effectively address actuator non-linear behaviors on multi-actuator fatigue tests. The overall performance of the hydraulic actuator is influenced by non-linear flow, spool lap cross-over, variating pressures in the actuator, seal friction, and pin slop. These non-linearities pose a limitation to the test cycle speed and to the controllability of force.

SUMMARY

One aspect is directed to a control system configured to control a plurality of actuators to perform fatigue cycles on a test article. The control system for each actuator comprises a function generator configured to output, for each load case pair, a stroke command signal specifying a target position of the actuator and a force command signal specifying a target force applied by the actuator. A stroke control loops comprises a feedforward path configured to differentiate and factor the stroke command signal, a feedback path configured to adjust the stroke command signal by a feedback signal, and a stroke summing junction configured to combine the feedforward path and the feedback path. A force control loop comprises a feedback path configured to adjust the force command signal by a force feedback signal, proportional and integral compensators, and a force summing junction configured to combine outputs from the proportional and integral compensators and the stroke control loop in an actuator control signal. Control circuits are configured to control the actuator in response to the actuator control signal.

In another aspect, the feedback path of the stroke control loop is configured to subtract the stroke feedback signal from the stroke command signal and the feedback path of the force control loop is configured to subtract the force feedback signal from the force command signal.

In another aspect, the stroke control loop comprises a stroke sensor that generates a stroke signal indicative of a stroke of the actuator.

In another aspect, the force control loop comprises a load cell that generates a force signal indicative of a force applied by the actuator to the test article.

In another aspect, the feedback path of the stroke control loop comprises proportional gain adjustment circuitry that factors a stroke feedback error signal and the feedforward path of the stroke control loop comprises proportional gain adjustment circuitry that factors a stroke-change feedforward signal.

In another aspect, the stroke command signal and the force command signal are predetermined values accessed by the function generator to perform the fatigue cycles.

In another aspect, the predetermined values are based on testing performed on an aircraft under test.

In another aspect, the control system is configured to perform the fatigue cycles on an aircraft structure.

In another aspect, the feedforward path of the stroke control loop does not require and does not account for the stroke feedback signal.

One aspect is directed to a method of controlling a plurality of actuators to perform fatigue cycles on a test article that comprises for each actuator and iteratively for each load case: retrieving a stroke command signal to control the actuator; retrieving a force command signal to control the actuator; generating a stroke control signal in response to the stroke command signal and a stroke feedback signal of a current position of the actuator; generating a force control signal in response to the force command signal and a force feedback signal of a current force applied by the actuator; combining the stroke control signal and the force control signal to drive the actuator; and wherein, upon each new load case, generating the stroke control signal additionally in response to a feedforward signal generated from the stroke command signal.

In another aspect, the stroke command signal specifies a target position of the actuator and the force command signal specifies a target force applied by the actuator.

In another aspect, combining the stroke control signal and the force control signal to drive the actuator comprises the stroke control signal configured to drive the actuator to the target position and the force control signal configured to drive the actuator to apply the target force.

In another aspect, generating the stroke control signal comprises summing a feedforward path that accounts for change in the stroke command signal and a feedback path that accounts for both of the stroke command signal and the feedback of the current position of the actuator.

In another aspect, the method further comprises generating the stroke control signal by combining a feedforward path that differentiates and factors the stroke command signal and a feedback path that subtracts a stroke feedback signal from the stroke command signal.

In another aspect, the method further comprises summing signals from a proportional compensator and an integral compensator of the force control loop with the stroke control signal from the stroke control loop.

In another aspect, the method further comprises combining the stroke control signal and the force control signal into an actuator control signal and feeding the actuator control signal to a valve driver and a servo valve and driving the actuator.

In another aspect, the method further comprises attaching the plurality of actuators to an aircraft and controlling the plurality of actuators to perform fatigue tests on the aircraft.

One aspect is directed to a computer-readable medium storing instructions executable by a processor to control an actuator to perform operations to conduct fatigue cycles on a test article with the operations comprising: retrieving a stroke command signal specifying a target position of the actuator; retrieving a force command signal specifying a target force applied by the actuator; generating a stroke control signal in response to the stroke command signal and feedback that senses a current position and changes in position of the actuator; generating a force control signal in response to the force command signal and feedback that senses a current force applied by the actuator; and combining the stroke control signal and the force control signal to drive the actuator to the target position and to apply the target force.

In another aspect, the operations further comprise upon each new test iteration, the transition between the load case, generating the stroke control signal additionally in response to a feedforward signal generated from change in the stroke command signal.

In another aspect, the operations further comprise summing a feedforward path that accounts for change in the stroke command signal and a feedback path that accounts for both the stroke command signal and the feedback from a sensor sensing the current position of the actuator.

The features, functions and advantages that have been discussed can be achieved independently in various aspects or may be combined in yet other aspects, further details of which can be seen with reference to the following description and the drawings.

DETAILED DESCRIPTION

The present application is directed to control compensation methods for controlling actuators that are applying forces to a test article during fatigue tests. The control compensation methods reduce force control tracking errors by the use of combined stroke feedforward and stroke feedback signals. The compensation methods counteract errors caused by multi-actuator cross coupling and other challenging behaviors caused by various issues with the actuators such as but not limited to non-linear flow through the servo valve, spool lap cross-over, variating pressures in the actuator, seal friction, and pin slop.

Figure 1:
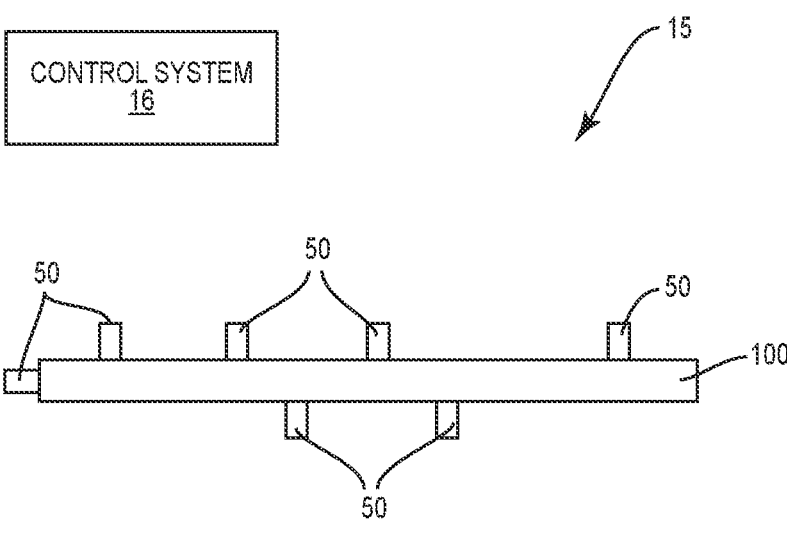
FIG. 1 is a schematic diagram of a test system configured to perform fatigue testing on a test article.

FIG. 1 illustrates an example of a test system 15 having multiple actuators 50 configured to apply forces to a test article 100. Each actuator 50 is configured to apply a force to the test article 100. The actuators 50 can be located at various points along the test article 100 and together can apply various degrees of force. Further the actuators 50 can apply the forces in various directions such as various compressive and tensile forces depending upon the requirements of the testing protocol and test load cases. The actuators 50 can simulate various operating conditions (load cases) upon the test article 100 involved in various fatigue tests for durability, performance, lifespan, and other testing procedures.

In some examples, the actuators 50 are hydraulic actuators that include an actuator rod and a piston that travel within a cylinder. The position and the rate of change of the position can be adjusted as necessary. In some examples, each of the actuators 50 is the same (e.g., each actuator 50 is a hydraulic actuator). In other examples, the test system 15 uses different actuators 50 to apply different forces to the test article 100. In some examples, the actuators 50 are part of an integrated unit that also includes one or more servo valves, control circuitry such valve drivers, load cells, and stroke sensors.

Figure 2:
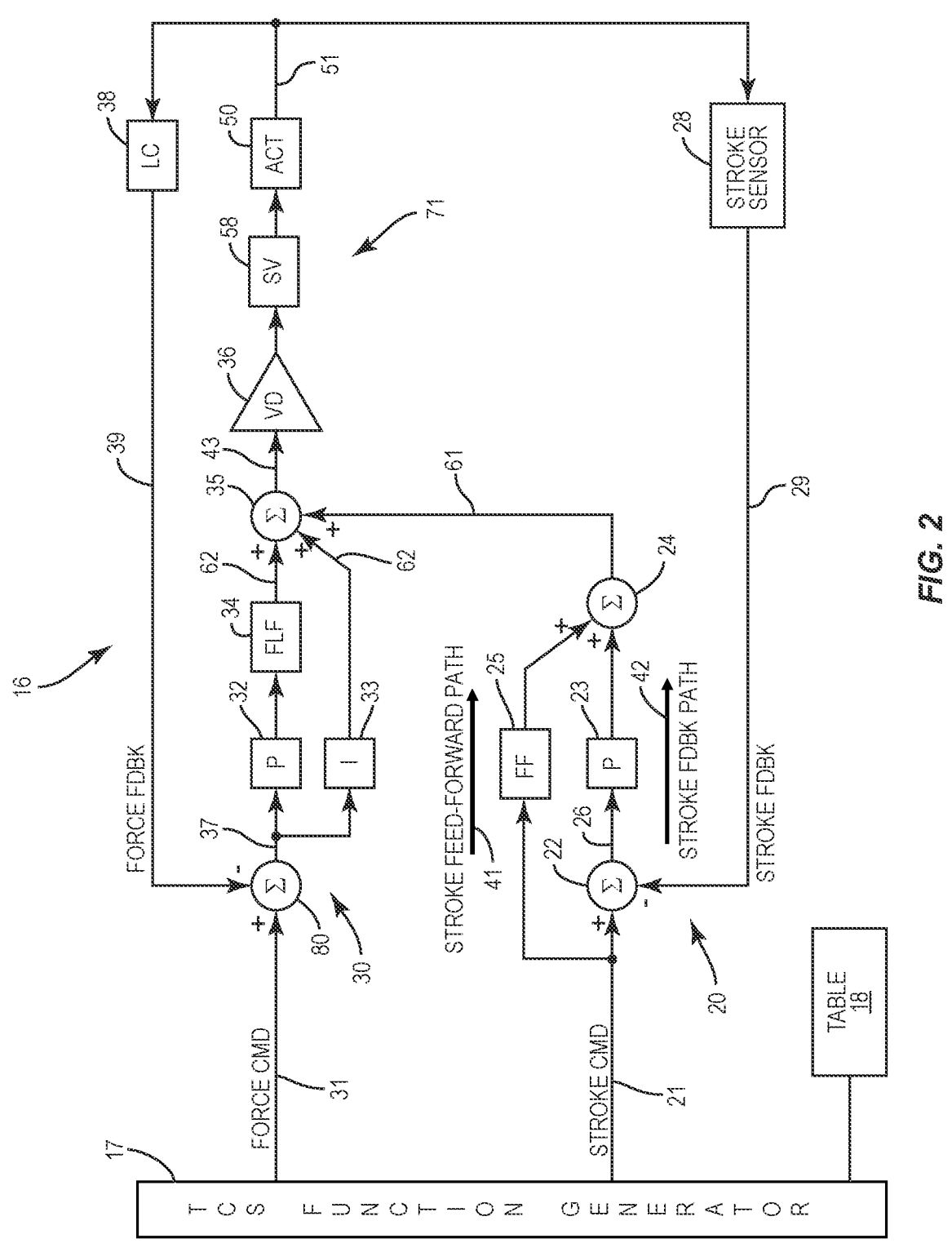
FIG. 2 is a schematic diagram of a control system configured to control an actuator to perform fatigue tests.

The test system 15 includes a control system 16 that sends and receives signals to control the actuators 50. FIG. 2 illustrates a block diagram of a control system 16 that controls operation of the actuators 50. The single actuator 50 included in FIG. 2 is for purposes of simplicity and clarity, as the control system 16 may be used for multi-actuator test systems 15.

The control system 16 includes a function generator 17 that generates command signals 21, 31 to control the operation of the actuator 50. The command signals 21, 31 may indicate a selected and/or desired movement of the actuator 50 to perform the desired testing protocol. In some examples, the stroke command signal 21 indicates a movement of the actuator 50 such as stroke length and stroke length change (velocity). In some examples, the force command signal 31 indicates a desired force that is to be exerted by the actuator 50. In some examples as illustrated in FIG. 2, a single function generator 17 generates both the command signals 21, 31 synchronized (in phase) for actuators 50 used in a test. In other examples, two or more different function generators are used to generate the signals.

The control system 16 includes a stroke control loop 20 to control the movement of the actuator 50 and a force control loop 30 to control the amount of force applied by the actuator 50. The stroke control loop 20 receives the stroke command 21 as input and includes a feedforward path 41 and a feedback path 42. The stroke feedforward path 41 manages issues raised by cross-coupling between the actuators 50. The feedforward path 41 receives the stroke command 21 and includes a feed forward differentiator and factor 25 that provides a valve drive command to move the actuator 50 as the function generator 17 transitions to the next load case.

The feedback path 42 adjusts for stroke errors in the actuator 50. The errors can be caused by various issues such as but are not limited to non-linear hydraulic flow, spool lap cross-over, variating pressures in the actuator, seal friction, and pin slop. The feedback path 42 includes a summing junction 22 that receives the stroke command 21 and a stroke feedback signal 29. In some examples, the feedback path 42 subtracts the stroke feedback signal 29 from the force command signal 21 to generate a stroke feedback error signal 26. A proportional gain adjustment circuit 23 factors the stroke feedback error signal 26 to create a closed loop drive signal to the servo valve 58 that makes the actuator 50 responsive and stable. A summing junction 24 sums the outputs of the two paths 41, 42 into a stroke control signal 61.

The force control loop 30 controls the amount of force applied by the actuator 50. The force control loop 30 includes a summing junction 80 that receives the force command signal 31 and a force feedback signal 39. The summing junction 80 outputs a force feedback error signal 37. In some examples, the summing junction 80 subtracts the force feedback signal 39 from the force command signal 31 to determine the force feedback error signal 37.

The force control loop 30 also includes a proportional gain adjustment circuit 32, an integral gain adjustment circuit 33, a forward loop filter 34, and a summing junction 35. The proportional gain adjustment circuit 32 factors the force feedback error signal 37 to create a closed loop drive signal to drive the servo valves 58 that makes the actuator responsive and stable. A forward loop filter 34 is a lead-lag compensation type filter used to remove high frequency content in the loop servo drive signal. The force control loop 30 also includes an integral gain adjustment circuit 33 that provides integration in the force control loop 30. In some examples, the integral gain adjustment circuit 33 applies a multiplier factor to the force feedback error signal 37 and runs the signal through an integrator circuit to correct shifts or offsets in the force control loop 30.

A force control signal 62 includes a first portion that feeds from the proportional gain adjustment circuit 32 and forward loop filter 34, and a second part feeds from the integral gain adjustment circuit 33. The two portions are summed together with the stroke control signal 61 at the force summing junction 35.

As illustrated in FIG. 2, the outputs of the force control loop 30 and the stroke control loop 20 are summed as an actuator control signal 43. The actuator control signal 43 is fed to control circuits 71 to control a servo valve 58 and the actuator 50. In the example of FIG. 2, the actuator control signal 43 is fed to a valve driver 36 that outputs a signal to a servo valve 58 that controls the flow of hydraulic fluid to the ports of the actuator 50 which controls the motion of the actuator 50. In some examples, the control circuits 71 control the actuator 50 in response to the actuator control signal 43 while maintaining stable closed loop control for both force and stroke control loops 20, 30.

The stroke control loop 20 includes a stroke sensor 28 that detects the movement of the actuator 50. In some examples the stroke sensor 28 is integrated with the actuator 50. In other examples the stroke sensor 28 receives an output signal 51 from the actuator 50. The stroke sensor 28 is configured to determine the current position of the actuator 50. In some examples, an error is determined that includes the difference between the commanded position from the stroke command signal 21 and the detected position of the actuator 50, measured via stroke sensor 28. The stroke feedback signal 29 carries the detected position to the summing junction 22 and the difference between the stroke feedback signal 29 and stroke command 21 is generated that is indicative of the detected position error.

The force control loop 30 includes a load cell 38 that measures the force being applied by the actuator 50 to the test article 100. In some examples, the load cell 38 is integrated with the actuator 50. In other examples, the load cell 38 receives an output signal 51 from the actuator 50. The load cell 38 converts a force applied by the actuator 50 into an electrical signal. In some examples, the load cell 38 is a force transducer that outputs an electrical signal that is proportional to the force. The load cell 38 generates a force signal indicative of a force applied by the actuator 50 to the test article 100. The force feedback signal 39 is based on the force signal. The force feedback signal 39 carries the current force applied by the actuator 50 to the sum junction 80 with the difference between the force feedback signal 39 and the force command signal 31 generated that is indicative of the detected force error.

During use, the command signals 21, 31 are supplied to the control system 16 by the function generator 17. The command signals 21, 31 indicate the desired movement and force of the actuator 50 to perform the testing process on the test article 100. In some examples, the function generator 17 includes and/or otherwise accesses a table 18 that includes force and stroke values for the load cases that are to be applied to the test article 100 during the testing protocols. In some examples, the table 18 is established by acquiring the force and stroke measurements during a prior application of the load case on another test article or usage of a finite element model.

The stroke command signal 21 is fed along the feedforward path 41 to the feed forward block 25 and produces a stroke output. The stroke feedforward path 41 provides input to control circuits 71 to move the actuator 50 as the function generator 17 transitions to the next load case.

The stroke command signal 21 is fed to the feedback path 42 that also includes the stroke feedback signal 29. The stroke feedback path 42 provides for stroke error adjustments to manage various issues with the actuator 50 such as non-linear flow, spool lap cross-over, variating pressures in the actuator 50, seal friction, and pin slop. In some examples, the stroke feedback signal 29 from the stroke feedback path 42 is the difference between stroke command 21 and feedback error signal 29. The amplitude of this error signal can be adjusted in the proportional gain adjustment circuit 23. This error signal can be adjusted to provide additional phase adjustment to the stroke feedforward compensation signal to optimize the performance of the force control loop 30. The outputs from the two paths 41, 42 are combined at the summing junction 24 to generate the stroke control signal 61.

As illustrated in FIG. 2, the force control loop 30 is a companion of the stroke control loop 20 and accepts the output of the stroke control loop 20 at the force summing junction 35. This input is summed with the two portions of the force control signal 62. An actuator control signal 43 is output from the summer 35 and provided to the valve driver 36.

The stroke control loop 20 of the control system 16 uses two independently adjustable signal paths 41, 42 to optimize the control performance of the force control loop 30. The gain adjustment for these paths is intuitive for the operator to optimize. The gain of the feedforward path 41 is adjusted to shift the actuator control input to align the slope and phase of force applied by the actuator 50 to the test article 100 to the force command. The gain of the feedback path 42 is adjusted to provide speedier servo action to achieve the load case. According to some examples, both compensation methods are integrated in support of full-scale fatigue tests.

The control system 16 provides for an operator to optimize the force control performance on fatigue tests that have multiple actuators 50. Vernier adjustment of the gains allows the operator to dial in the compensation to an optimal "sweet spot" for force control performance. In some examples, the table 18 of stroke values is commensurate with the deflection of the test article 100 for each load case. Given that fatigue tests repeat the application of load cases, these values can be acquired by measuring the strokes during the first application of the load cases and used for subsequent application of the load cases.

The components of the control system 16 including the force generator 17 and components of the stroke control loop 20 and force control loop 30 may refer to, or be part of an electronic circuit, a combinational logic circuit, a field programmable gate array (FPGA), a processor (shared, dedicated, or group) that executes code, or a combination of some or all of the above, such as in a system-on-chip. In some examples, the components are microprocessor-based such as a computer having at least one processor, memory (RAM and/or ROM), and associated input and output buses. In some examples, the processor operates under the control of an operating system that resides in memory. In some examples, the operating system manages computer resources so that computer program code embodied as one or more computer software applications, such as an application residing in memory, includes instructions executed by the processor. In some examples, the processor executes the application directly, in which case the operating system may be omitted.

The combined stroke feedforward and stroke feedback compensation method enables the benefit of driving the actuators 50 to desired strokes at a fast pace while using the stroke error feedback to overcome the non-linear behavior in the actuators 50.

Figure 3:
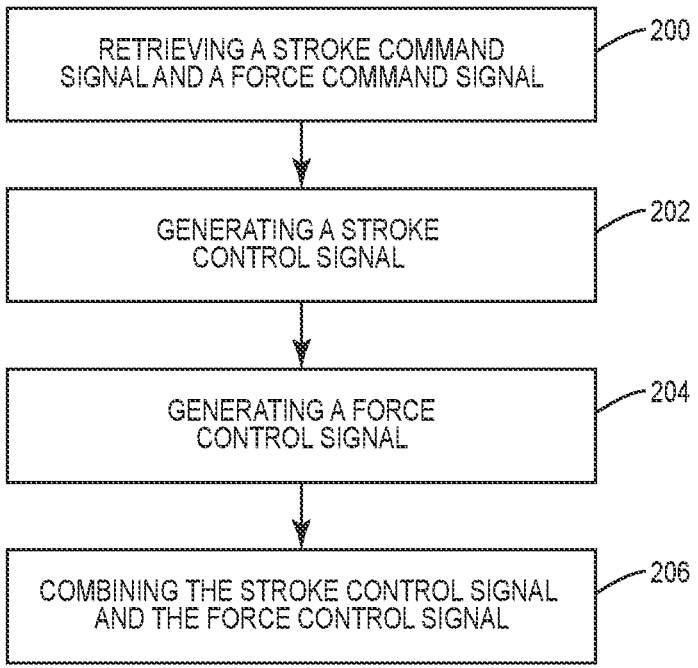
FIG. 3 is a flowchart diagram of a method of controlling actuators to perform fatigue tests on a test article.

FIG. 3 illustrates a method of controlling actuators 50 to perform fatigue tests on a test article 100. For the test, each actuator 50 iteratively performs these steps. The method includes retrieving a stroke command signal 21 and a force command signal 31 (block 200). These signals provide for operating the actuator 50 to apply the necessary forces to the test article 100. A stroke control signal 61 is generated in response to the stroke command signal 21 and feedback signal 29 of a current position of the actuator 50 (block 202). A force control signal 62 is generated in response to the force command signal 31 and force feedback signal 39 of a current force applied by the actuator 50 (block 204). The method includes combining the stroke control signal 61 and the force control signal 62 to drive the actuator 50 (block 206). For each new test iteration, the method includes generating the stroke control signal 61 additionally in response to a feedforward signal generated from the stroke command signal 21.

In some examples, the polarities of the load cells 28, 38 may be inverted. The overall polarity remains positive wherein a positive drive signal to the servo valve 58 produces a positive polarity change in feedback signals 29, 39 for the summing junctions 22, 80 for the force and stroke control loops 20, 30.

Figure 4:
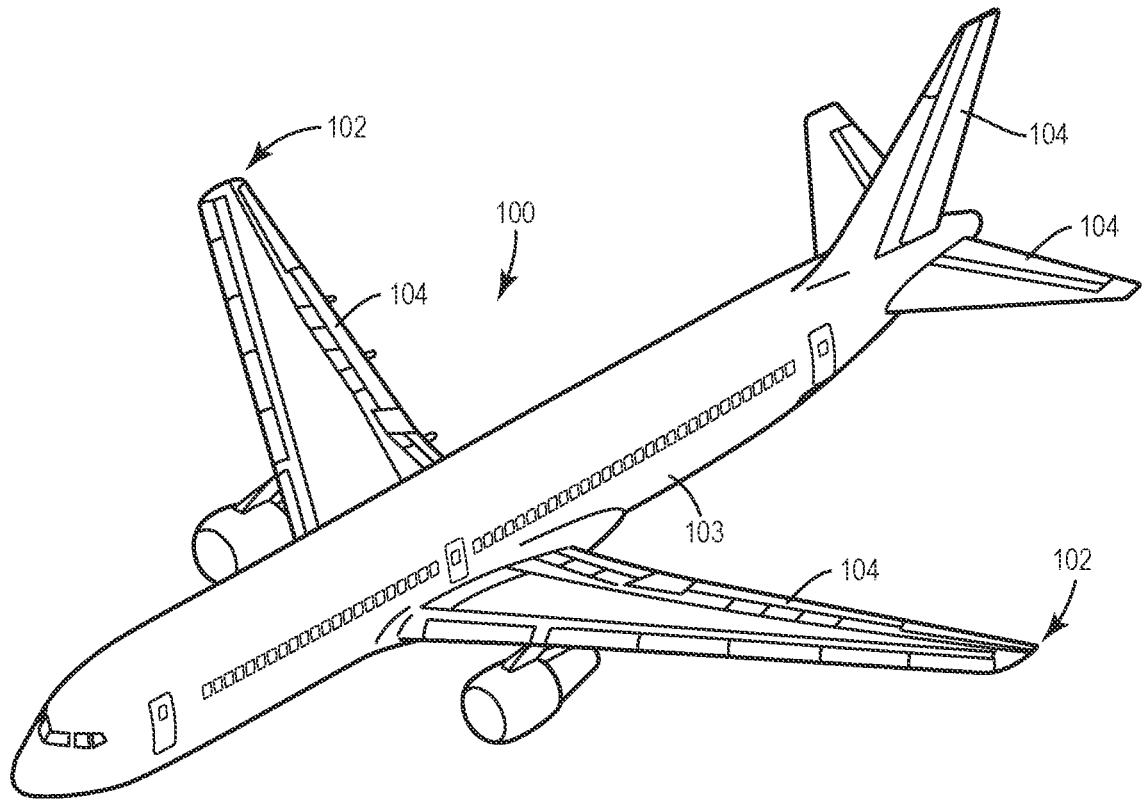
FIG. 4 is a schematic diagram of an aircraft that is an example of a test article that is tested by the test system.

The test system 15 can be used for testing a variety of different test articles 100. FIG. 4 illustrates one example of a test article 100 being a commercial aircraft. The testing can occur on one or more areas of the aircraft, such as but not limited to stress testing on the wings 102, sections of the fuselage 103, and various flight control members 104. The test system 15 may be used for testing a variety of other test articles 100 and components.

The present methods and systems may be carried out in other ways than those specifically set forth herein without departing from essential characteristics disclosed herein.

The present embodiments are to be considered in all respects as illustrative and not restrictive, and all changes coming within the meaning and equivalency range of the appended claims are intended to be embraced therein.

What is claimed is:

1. A control system configured to control a plurality of actuators to perform fatigue cycles on a test article, comprising, for each actuator:

a function generator configured to output, for each load case pair, a stroke command signal specifying a target position of the actuator and a force command signal specifying a target force applied by the actuator;

a stroke control loop comprising:

a feedforward path configured to differentiate and factor the stroke command signal;

a feedback path configured to adjust the stroke command signal by a stroke feedback signal; and a stroke summing junction configured to combine the feedforward path and the feedback path;

a force control loop comprising:

a feedback path configured to adjust the force command signal by a force feedback signal;

proportional and integral compensators; and a force summing junction configured to combine outputs from the proportional and integral compensators and the stroke control loop in an actuator control signal; and control circuits configured to control the actuator in response to the actuator control signal.

2. The control system of claim 1, wherein the feedback path of the stroke control loop is configured to subtract the stroke feedback signal from the stroke command signal and the feedback path of the force control loop is configured to subtract the force feedback signal from the force command signal.

3. The control system of claim 1, wherein the stroke control loop comprises a stroke sensor that generates a stroke signal indicative of a stroke of the actuator.

4. The control system of claim 1, wherein the force control loop comprises a load cell that generates a force signal indicative of a force applied by the actuator to the test article.

5. The control system of claim 1, wherein the feedback path of the stroke control loop comprises proportional gain adjustment circuitry that factors a stroke feedback error signal and the feedforward path of the stroke control loop comprises proportional gain adjustment circuitry that factors a stroke-change feedforward signal.

6. The control system of claim 1, wherein the stroke command signal and the force command signal are predetermined values accessed by the function generator to perform the fatigue cycles.

7. The control system of claim 6, wherein the predetermined values are based on testing performed on an aircraft under test.

8. The control system of claim 7, wherein the control system is configured to perform the fatigue cycles on aircraft structure.

9. The control system of claim 1, wherein the feedforward path of the stroke control loop does not require and does not account for the stroke feedback signal.

10. A method of controlling a plurality of actuators to perform fatigue cycles on a test article, comprising, for each actuator and iteratively for each load case:

retrieving a stroke command signal to control the actuator;

retrieving a force command signal to control the actuator;

generating a stroke control signal in response to the stroke command signal and a stroke feedback signal of a current position of the actuator;

generating a force control signal in response to the force command signal and a force feedback signal of a current force applied by the actuator;

combining the stroke control signal and the force control signal to drive the actuator; and wherein, upon each new load case, generating the stroke control signal additionally in response to a feedforward signal generated from the stroke command signal.

11. The method of claim 10, wherein the stroke command signal specifies a target position of the actuator and the force command signal specifies a target force applied by the actuator.

12. The method of claim 11, wherein combining the stroke control signal and the force control signal to drive the actuator comprises the stroke control signal configured to drive the actuator to the target position and the force control signal configured to drive the actuator to apply the target force.

13. The method of claim 10, wherein generating the stroke control signal comprises summing a feedforward path that accounts for change in the stroke command signal and a feedback path that accounts for both of the stroke command signal and feedback of the current position of the actuator.

14. The method of claim 10, further comprising generating the stroke control signal by combining a feedforward path that differentiates and factors the stroke command signal and a feedback path that subtracts a stroke feedback signal from the stroke command signal.

15. The method of claim 10, further comprising summing signals from a proportional compensator and an integral compensator of a force control loop with the stroke control signal from a stroke control loop.

16. The method of claim 10, further comprising combining the stroke control signal and the force control signal into an actuator control signal and feeding the actuator control signal to a valve driver and a servo valve and driving the actuator.

17. The method of claim 10, further comprising attaching the plurality of actuators to an aircraft and controlling the plurality of actuators to perform fatigue tests on the aircraft.

18. A non-transitory computer-readable medium storing instructions executable by a processor to control an actuator to perform operations to conduct fatigue cycles on a test article, the operations comprising:

retrieving a stroke command signal specifying a target position of the actuator;

retrieving a force command signal specifying a target force applied by the actuator;

generating a stroke control signal in response to the stroke command signal and feedback from sensing a current position and changes in position of the actuator;

generating a force control signal in response to the force command signal and feedback from sensing a current force applied by the actuator; and combining the stroke control signal and the force control signal to drive the actuator to the target position and to apply the target force.

19. The computer-readable medium of claim 18, wherein the operations further comprise for the transition between load cases, generating the stroke control signal additionally in response to a feedforward signal generated from change in the stroke command signal.

20. The computer-readable medium of claim 18, further comprising summing a feedforward path that accounts for change in the stroke command signal and a feedback path that accounts for both the stroke command signal and the feedback from a sensor sensing the current position of the actuator.

* * * * *